United States Patent [19]

Ishida et al.

[11] Patent Number: 5,405,534
[45] Date of Patent: Apr. 11, 1995

[54] PROCESS FOR SEPARATING AND PURIFYING A MULTICOMPONENT MIXTURE

[75] Inventors: Masaru Ishida, Yokohama; Takeshi Hatanaka, Kawasaki, both of Japan

[73] Assignee: Soken Kagaku Kabushiki Kaisha, Tokyo, Japan

[21] Appl. No.: 114,331

[22] Filed: Aug. 30, 1993

Related U.S. Application Data

[63] Continuation of Ser. No. 818,927, Jan. 10, 1992, abandoned.

[30] Foreign Application Priority Data

Jan. 16, 1991 [JP] Japan .................. 3-015882

[51] Int. Cl.⁶ .............................. B01D 15/02
[52] U.S. Cl. .................... 210/662; 210/672; 210/676; 210/677
[58] Field of Search ........ 210/662, 670, 672, 675–677, 210/96.1, 264, 267, 269, 284

[56] References Cited

U.S. PATENT DOCUMENTS

| | | | |
|---|---|---|---|
| 2,797,190 | 6/1957 | Scott et al. | 210/672 |
| 2,985,589 | 5/1961 | Broughton et al. | 210/676 |
| 3,421,984 | 1/1969 | Jensen et al. | 210/670 |
| 4,522,726 | 6/1985 | Berry et al. | 210/267 |

Primary Examiner—Ivars Cintins
Attorney, Agent, or Firm—Koda and Androlia

[57] ABSTRACT

A process and apparatus for continuously separating a multicomponent mixture containing at least 3 components and purifying each component in a high concentration, high purity and high recovery, wherein the apparatus comprises a column group comprising a fractionation zone, a purification zone and a desorption zone which are formed by combining at least 2 columns to form one subgroup and combining at least 3 zones; column connection tubings for in series connecting the columns in the fractionation zone; subgroup connection tubings for connecting corresponding columns of two subgroups positioned in the separation zone (in series) and the purification zone (in parallel); zone connection tubings for in parallel connecting each column of the fractionation zone and each column of the purification zone; purification/desorption medium-feeding tubings for feeding each purification/desorption medium to each column of the purification and desorption zones; a subject mixture-feeding means for feeding a multicomponent mixture to the column of the uppermost stream of the fractionation zone; and a column group movement means for successively moving the columns from the present subzone to the next subzone and/or a switching means for switching the tubing flow between columns by opening or closing of valves.

5 Claims, 5 Drawing Sheets

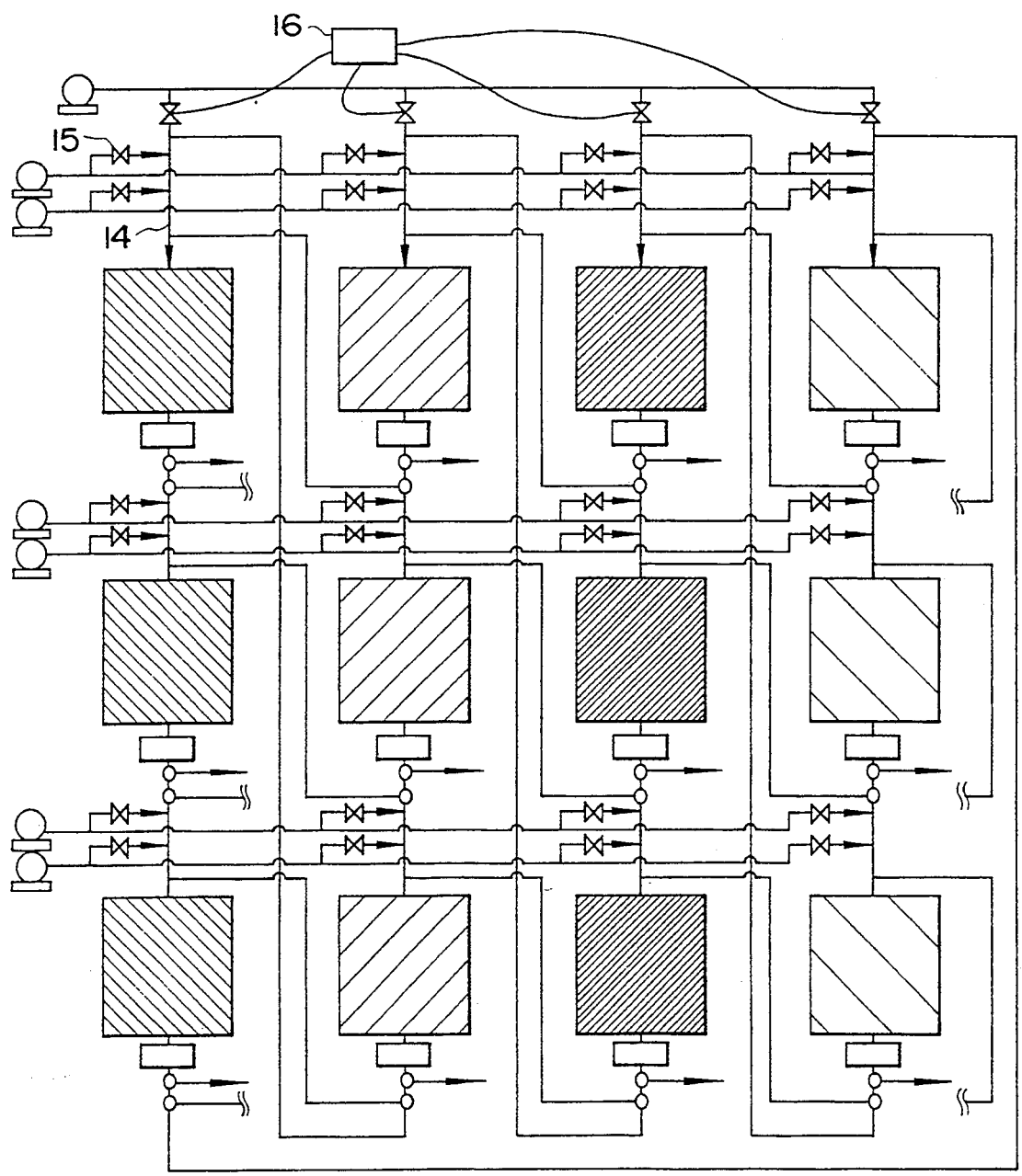
F I G. 6

PROCESS FOR SEPARATING AND PURIFYING A MULTICOMPONENT MIXTURE

This is a continuation of application Ser. No. 818,927, filed Jan. 10, 1992, now abandoned.

BACKGROUND OF THE INVENTION

1. Technical Field

This invention relates to a multicomponent separation/purification process and apparatus for separating the multicomponent mixture containing at least 3 components and purifying each component to be recovered.

2. Related Techniques

Heretofore, techniques such as gas chromatography and liquid chromatography utilizing the difference in distribution coefficient against adsorbents have been known as means for separating and purifying a multicomponent mixture.

These separation/purification means have excellent separation ability and therefore they have been widely used in chemical analysis of complex mixtures. However, when these means are used as separation/purification means on an industrial scale, the purification cost is high due to batch operation. Accordingly, the application fields of such means are limited.

On the other hand, in a pseudo-moving bed adsorption separation apparatus wherein continuous operation is used on an industrial scale such as continuous separation apparatus described in U.S. Pat. No. 2,985,589, a mixture containing 2 components is separated. However, it is difficult to continuously separate a mixture containing at least 3 components by a single apparatus.

In a process for continuously separating 3 components by a pseudo-moving bed adsorption separation apparatus recently proposed in Japanese Patent Laid-Open Publication No. 80409/1989, the separation has been realized by alternately disposing a column packed with a first packing wherein its distribution coefficient against Components A, B and C is Component A<Component B<Component C and a column packed with a second packing wherein its distribution coefficient is Component A<Component C<Component B and flowing the solution through the columns.

However, it is necessary to use mixtures and packing which meet the above condition for the distribution coefficient in such a separation process. Mixtures and packings which meet such requirements are less and therefore ternary or higher mixtures capable of separating and purifying them are limited. Thus, such a process is a less practical separation process.

Further, if multicomponent mixtures containing at least 4 components are separated and purified utilizing the process described above, the conditions become more severe and it is virtually impossible to continuously separate and purify multicomponent mixtures containing at least 4 components.

Furthermore, the process described above discloses only the use of the flow of between-columns and the operation of respective one column and therefore the reflux efficiency is inferior. A long period of time is required until stabilization is obtained or high concentration and high purity are achieved. Since the separated products which is discharged up to the time are in vain or adverse effects such as the reduction of an average purity occur, such facts lead to the increase of production cost and it is difficult to apply such a process to small-quantity production.

In order to get high purity in such a process, mixtures and adsorbents having large difference in distribution coefficient are required, but it is extremely difficult to find such mixtures and adsorbents and therefore subject materials are limited.

SUMMARY OF THE INVENTION

Subject Matter

We have now found that a multicomponent mixture containing at least 3 components can be fractionated into each component by handling separation columns in a subgroup unit composed of at least 2 columns as one set, dividing the columns into a fractionation zone, a purification zone and a description zone, feeding purification/desorption mediums in series in the fractionation zone, and in parallel in the purification and desorption zones, forming both flows in the fractionation zone adjacent to the purification zone, and successively moving these columns.

The present invention provides a process for separating and purifying a multicomponent mixture which comprises separating and purifying a mixture containing a number of components by the difference in their distribution coefficient at every component using a plurality of columns, said process comprising the steps of dividing said plurality of columns into subgroups composed of at least 2 columns, disposing these subgroups to form at least three zones composed of a fractionation zone, a purification zone and a desorption zone, connecting the columns in the subgroup positioned in said fractionation zone so that each flow of fluids is in series, introducing the feed stream to the uppermost column in said fractionation zone, mixing impure fluid refluxed as respective parallel flows from each column of said purification zone with each flow of the fluids in corresponding columns in the fractionation zone, fractionating the mixture; refluxing each flow of impure fluids in columns present in a subgroup positioned in said purification zone to the columns in the subgroup positioned in the fractionation zone as respective parallel flows, introducing mediums for purification to these columns in the subgroup positioned in said purification zone as respective flows to carry out the purification; flowing mediums for desorption into columns in the subgroup positioned in the desorption zone to flow out the component purified in said purification zone, recovering the remaining component from the lowermost flow of the fractionation zone wherein the separation and purification are carried out (a) by successively moving the whole of the column group composed of subgroups disposed in each step consisting of said fractionation purification, and desorption zones by handling each subgroup of columns as a set and by keeping the connecting lines at fixed position (b) by successively switching the flow of fluids in tubings between columns by opening or closing of valves to obtain the same function as (a), or (c) by combining the methods (a) and (b).

The present invention also provides an apparatus for separation and purification of a multicomponent mixture comprising a column group wherein at least 2 columns per one subgroup are combined and said subgroups are respectively disposed in at least three zones consisting of a fractionation zone, a purification zone and a desorption zone; column connection tubings for in series connecting the columns in the subgroup positioned in said fractionation zone of said column group;

subgroup connection tubings for connecting corresponding columns of two subgroups positioned in said separation zone (in series) and purification zone (in parallel); zone connection tubings for in parallel connecting each column of the subgroup positioned in said purification zone and each column of the subgroup positioned in said fractionation zone; purification/desorption medium-feeding tubings for individually introducing each purification/desorption medium to each column of the subgroup positioned in said purification zone and desorption zone; a subject mixture-feeding means for feeding a multicomponent mixture to the top of the column of the uppermost stream of said fractionation zone; and a column group movement means for successively moving said column subgroups to the next zone and/or a switching means for switching the tubing flow between columns by opening or closing of valves.

Effect

The process and apparatus for the separation and purification of a multicomponent mixture of the present invention exclude special conditions as compared with the prior art process and apparatus for the separation of a multicomponent mixture. When there is slight difference in elution time between the components of a mixture against the packing, the separation can be carried out in high concentration, high purity and high recovery. Accordingly, almost all mixtures are subjects to be separated and the apparatus of the present invention can be a universal separation/purification apparatus. Thereby, the capital expenditure of installations can be reduced. Because the operation and the structure are relatively simple, the maintenance becomes easy and the safety can also be improved.

Many components can be separated into respective components by a single apparatus. Further, the efficient reflux is carried out by a plurality of inflow inlets of mediums for purification and the parallel flows between columns in different column subgroups. Thus, the time required for reaching stabilization can be reduced and economy can be greatly improved. Furthermore, the high purity is realized even in initial stage with respect to the purity and the present process and apparatus can be applied to small quantity production.

The structure of the apparatus having flexibility and the easy operation are rendered possible by introducing new flows and dividing inflow inlets of mediums for purification into a plurality of inflow inlets and therefore various system structures can be used. Thus, applicability is greatly increased and various mixtures can be separated by the same principle. Accordingly, the advantages described above can play an important role in multicomponent separation.

BRIEF DESCRIPTION OF THE DRAWINGS

While the specification concludes with claims which particularly point out and distinctly claim the subject matter regarded as forming the present invention, it is believed that the invention will be better understood from the following description taken in conjunction with the accompanying drawings in which:

FIG. 6 is a view showing a principle of the operation of an apparatus for the separation and purification of a multicomponent mixture wherein the control is carried out by the operation of a switching valve.

DETAILED DESCRIPTION OF THE INVENTION

Figure 1:
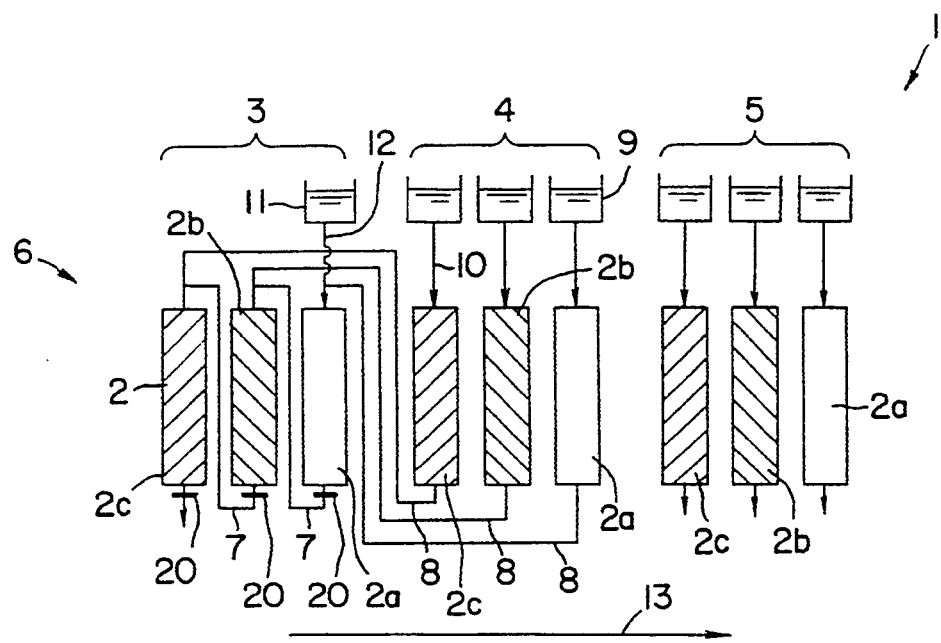
FIG. 1 is a flow sheet of an apparatus for the separation and purification of a multicomponent mixture of the present invention which comprises a column group wherein it is composed of 3 subgroups of a fractionation zone, a purification zone, and a desorption zone, the number of columns of each zone is 3 and the total of the columns is 9.
Figure 5:
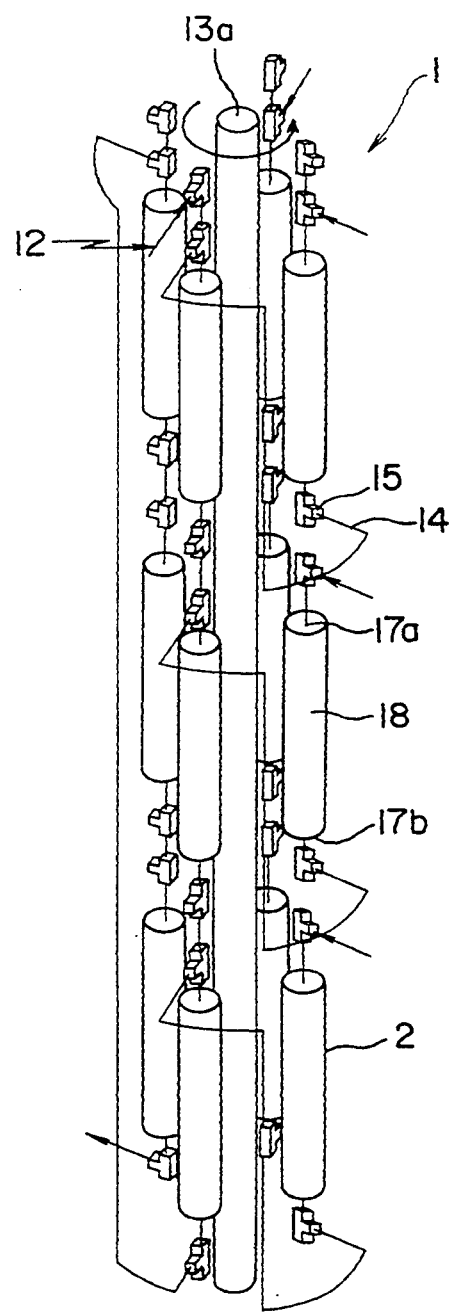
FIG. 5 is a perspective view of an apparatus for the separation and purification of a multicomponent mixture wherein the movement of a column group fixed in a rotating shaft is carried out by rotating said rotating shaft to move columns.

[I] Apparatus for the Separation and Purification of Multicomponent Mixtures (1) Structure As shown in FIG. 1, the apparatus for the separation and purification of a multicomponent mixture of the present invention basically comprises a column group 6 wherein at least 2 columns 2 per one subgroup are combined and said subgroups are respectively disposed in at least three zones consisting of a fractionation zone 3, a purification zone 4 and a desorption zone 5; column connection tubings 7 for connecting the columns 2 in the subgroup positioned in said fractionation zone 3 of said column group 6 in series; zone connection tubings 8 for in parallel connecting each column 2 of the subgroup positioned in said fractionation zone 3 and each column 2 of the subgroup positioned in said purification zone 4; purification/desorption medium-feeding tubings 10 for individually feeding each purification/desorption medium 9 to each column 2 of the subgroup positioned in said purification zone 4 and desorption zone 5; a subject mixture-feeding means 12 for feeding a multicomponent mixture 11 to the top of the column 2 of the uppermost stream of said fractionation zone 3; and a column group movement means 13 by a rotating shaft 13a in FIG. 5 for moving said column subgroups at every shift time to the next zone and/or by a switching means 16 in FIG. 6 for switching the tubing flow 14 between said zones at every subgroup by opening or closing of valves 15.

(2) Apparatus

(a) Column Group

In the present invention, as shown in FIG. 5, it is important to use a separation/purification apparatus 1 wherein a number of columns 2 each composed of a vessel 18 equipped with an inlet 17a and an outlet 17b used.

The number of the columns 2 used can vary depending upon the number of components of a multicomponent mixture 11 to be separated and purified. In the case of a multicomponent mixture 11 containing at least 3 components, it is necessary to use a column group 6 which is divided into subgroups composed of at least 2 columns, disposing said subgroups to form at least three zones composed of a fractionation zone 3, a purification zone 4 and a desorption zone 5. It is possible to use one subgroups of columns for purification in the former half of the shift cycle and for desorption in the latter half of the shift cycle by valve operation. This case is considered to have three zones; fractionation zone, purification zone and desorption zone.

The number of the columns 2 in one subgroup is determined by the number of components of a multicomponent mixture 11 to be separated and purified. Concretely, the number of the columns in one subgroup can be determined by the following equation but it is increased or reduced depending upon the characteristics of a multicomponent mixture to be separated and purified and the requirement of the purity and recovery:

Number of columns = (number of components of multicomponent mixture) − 1

When the number of the columns 2 is the same as the number of components of a multicomponent mixture 11, a medium 9 for purification and desorption can be recovered in a purified state from the lowermost end of the fractionation zone.

Concretely, when the number of components of a multicomponent mixture is 4, as shown in FIG. 1, there is used a column group 6 wherein it is composed of a fractionation zone 3, a purification zone 4, and a desorption zone 5, the number of columns 2 of each zone is 3 and the total of the columns is 9.

Figure 2:
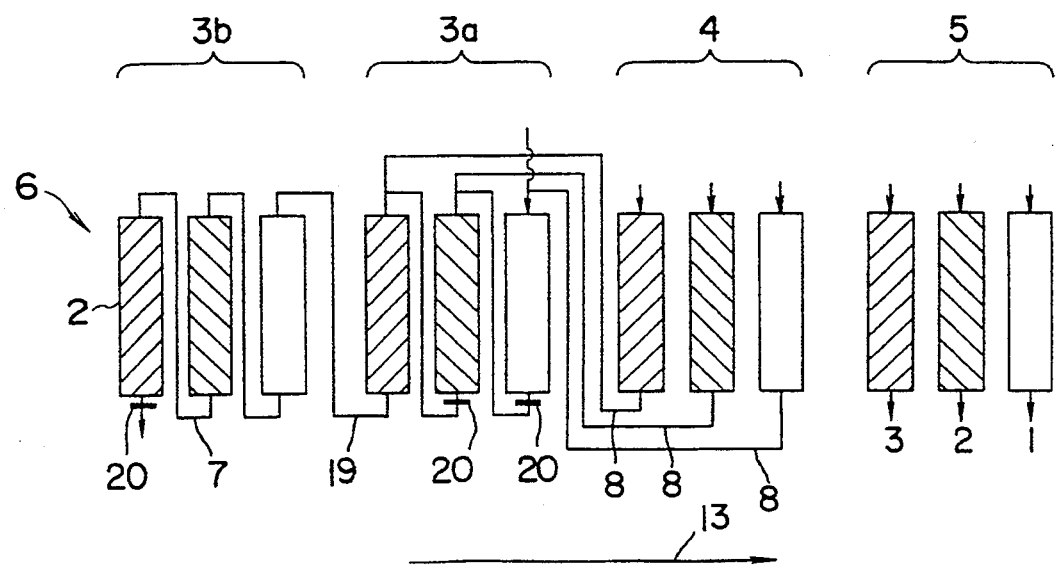
FIG. 2 is a flow sheet of an apparatus for the separation and purification of a multicomponent mixture of the present invention which comprises a column group wherein it is composed of four subgroups of a fractionation recovery subzone, a fractionation reflux subzone, a purification zone, and a desorption zone, the number of columns of each zone is 3 and the total of the columns is 12.

As shown in FIG. 2, an additional fractionation zone is added as additional subgroup. Thus, there is preferably used a column group 6 wherein it is composed of zones of four subgroups, i.e., a fractionation recovery subzone 3b, a fractionation reflux subzone 3a, a purification zone 4, and a desorption zone 5, the number of columns 2 of each zone is 3 and the total of the columns is 12.

Figure 3:
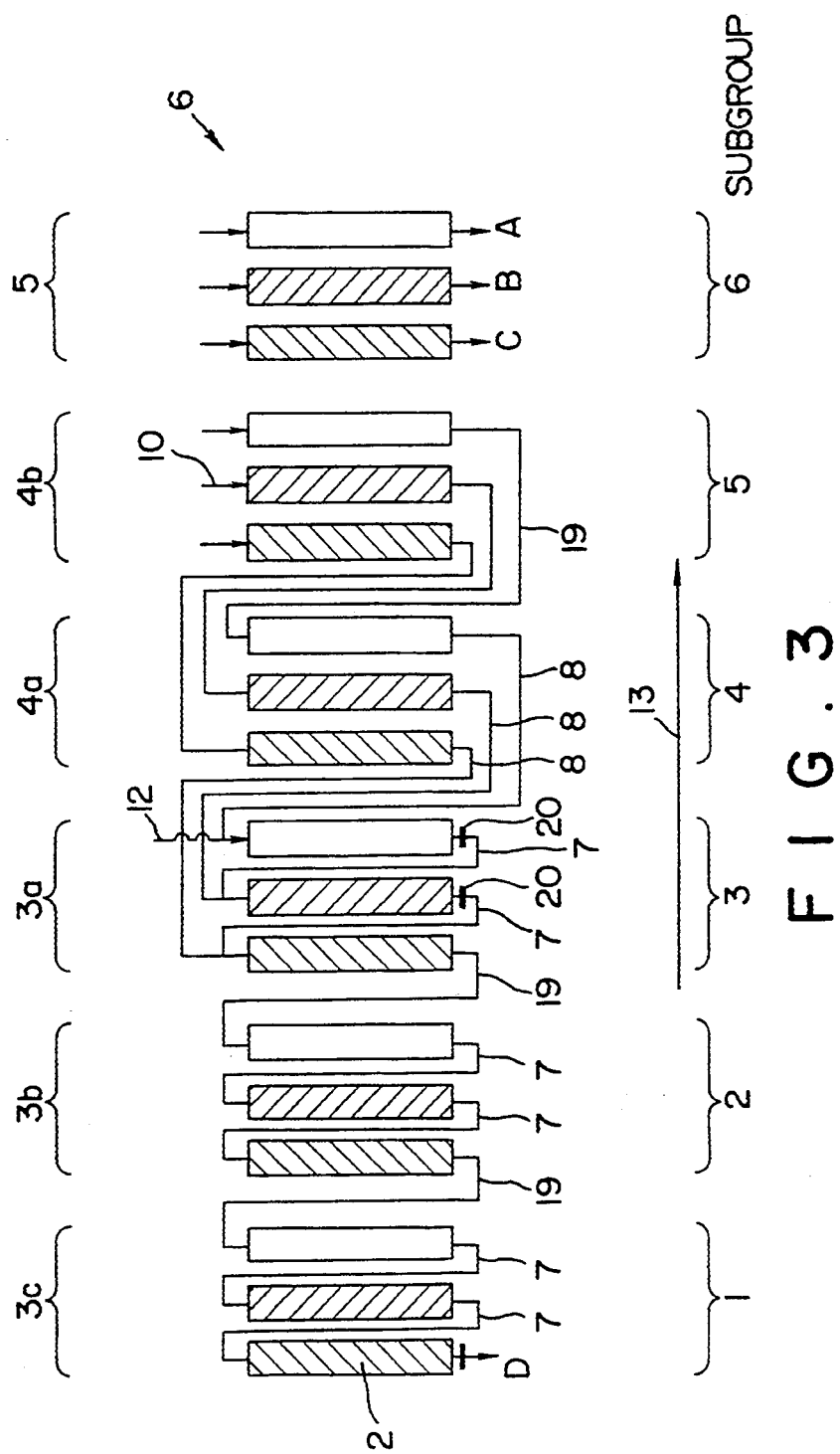
FIG. 3 is a flow sheet of an apparatus for the separation and purification of a multicomponent mixture of the present invention which comprises a column group wherein it is composed of six subgroups of a second fractionation recovery subzone, a first fractionation recovery subzone, a fractionation reflux subzone, a first purification subzone, a second purification subzone and a desorption zone, the number of columns of each zone is 3 and the total of the columns is 18.

As shown in FIG. 3, a fractionation zone 3 is constituted by 3 subgroups and a purification zone 4 is constituted by 2 subgroups. Thus, there is used a column group 6 wherein it is composed of zones of six subgroups, i.e., a second fractionation recovery subzone 3c, a first fractionation recovery subzone 3b, a fractionation reflux subzone 3a, a first purification subzone 4a, a second purification subzone 4b, and a desorption zone 5, the number of columns 2 of each zone is 3 and the total of the columns is 18.

The whole of the column group 6 described above is successively moved by means of a column group movement means 13 in each group unit to separate, purify and recover each component via each zone. Such a column movement is carried out by rotating a rotating shaft 13a to move the column group fixed in the rotating shaft 13a as shown in FIG. 5. Alternatively, the separation and purification can be carried out by means of a separation/purification means as shown in FIG. 6 wherein switching tubing flows 14 between zones are operated by switching the flows at every subgroups by a switching means 16 by opening or closing valves 15. Alternatively, the separation and purification can be carried out by a combination of the column group movement and valve switching.

(b) Tubing between Columns

As shown in FIG. 3, tubings 7 between columns connected in series are disposed in between columns 2 in the subgroup positioned in the fractionation zone 3 of the column group 6.

(c) Tubing between Subgroups

While the fractionation-zone 3 may be used in a multistage manner as a second fractionation recovery subzone 3c, a first fractionation recovery subzone 3b and a fractionation reflux subzone 3a. There are used tubings 19 between subgroups (in series) by which the last column 2c and the first column 2a of the next subgroup are connected in series.

The purification zone 4 can be divided into a first purification subzone 4a and a second purification subzone 4b and the purification can be carried out in a multistage manner. When the first purification subzone 4a and the second purification subzone 4b are connected, there is used tubings 19 between subgroups (in parallel) by which the columns 2 of the first purification subzone 4a and the columns 2 of the second purification subzone 4b are in parallel connected so that the columns 2a, 2b and 2c of the second purification subzone 4b are connected with the columns 2a, 2b and 2c of the first purification subzone 4a, respectively.

The tubings 19 may not restricted to the case of connecting columns in adjacent column subgroups. In FIG. 3, the columns in the first purification subzone moves to the second purification subzone at the next shift time, and then to the desorption zone. But the desorption zone may be located between the first and the second purification subzones. Also in this case, the tubings 19 connecting both purification subzones belongs to the tubing between subgroups.

(d) Tubing for the Connection between zones

When each column 2 of the subgroup positioned in the purification zone 4 and each column 2 of the subgroup positioned in the fractionation zone 3 are connected, there is used a tubing 8 for the connection between zones (in parallel) by which each column of the subgroup positioned in the fractionation zone 3 and each column 2 of the subgroup positioned in the purification zone 4 are in parallel connected so that the columns 2a, 2b and 2c of the purification zone 4 are connected with the columns 2a, 2b and 2c of the fractionation zone 3, respectively.

Accordingly, as shown in FIG. 3, when the fractionation zone 3 is divided into a second fractionation recovery subzone 3c, a first fractionation recovery subzone 3b and a fractionation reflux subzone 3a and the fractionation is carried out in a multistage manner, the column 2 of the fractionation reflux subzone 3a adjacent to the purification zone 4 is connected with the same numbered column 2 of at least one of subgroups of the purification zone 4 by tubings for the connection between zones.

(e) Purification/Desorption Medium-Feeding Tubing

Each purification/desorption medium-feeding tubing 10 for feeding purification/desorption mediums 9 is connected with each column 2 of the subgroups positioned in the purification zone 4 and desorption zone 5 and the purification/desorption mediums 9 are fed. To improve the purity or recovery, mediums having different pHs (hydrogen ion concentration) or ionic strength or composed of plural solvents in different concentrations can be utilized as purification/desorption media 9 in each of the columns 2.

In order to recover each component in the desorption zone 5, desorption mediums 9 different from the purification mediums 9 used in the purification zones described above can be fed to the column 2 of the desorption zone 5 if necessary.

The purification/desorption mediums can be fed continuously or intermittently and at constant feed rate or varying feed rate.

(f) Subject Mixture-Feeding Tubing

The subject multicomponent mixture 11 containing at least 3 components is mixed with the refluxed flow from the purification zone and fed to the top of the column 2a of the uppermost stream of the fractionation zone 3 described above by means of a subject mixture-feeding tubing 12.

The feeding of the subject multicomponent mixture described above can be carried out continuously or intermittently and at constant feed rate or varying feed rate.

(g) Column Group Movement Means or Valve-Switching Means

A column group movement means 13 for moving each column subgroup of the column group 6 to the next zone is provided. As shown in FIG. 5, columns 2 fixed in a rotating shaft 13a are disposed in the periphery of the rotating shaft 13a and the relating shaft 13a is rotated to move the column group. The column group can be connected with tubings and detectors disposed in the peripheral wall of the rotating shaft. Alternatively, a valve-switching means 16 for switching the tubing flows between columns by opening or closing of the valve 15 is provided. Alternatively, a combination of both means described above is used.

(h) Detector

As shown in FIG. 1, detectors 20 are provided in the outlet portion of columns of the fractionation zone in order to determine the time for moving each column subgroup of the column group movement means 13.

At the time or before (i) the component (component A) having a largest distribution coefficient in the mixture, (ii) the component (component B) having a next larger distribution coefficient or (iii) the component having the smallest distribution coefficient are detected over the limit of allowable concentration (i) at the outlet of the first column 2a of the subgroup positioned in the fractionation reflux subzone, (ii) at the outlet 2b of the second column and (iii) at the lowermost stream of the fractionation zone by detectors 20, each column subgroup is moved by the column group movement means 13.

Such detectors 20 include differential refractometers, spectrophotometers for ultraviolet and visible region and spectrophotofluorometers. The detection portion is predetermined in many cases and thus only one detector may be installed. Because the switching time becomes substantially constant, the detector can be omitted if the switching is carried out at the appropriate constant time.

[II] Subject Mixture

Subject mixtures to be separated and purified in the apparatus 1 for the separation and purification of the multicomponent mixture of the present invention are multicomponent mixtures. The highest effects can be obtained in the case of the multicomponent mixtures containing at least 3 components.

Processes in which such multicomponent separation and purification are required are as follows: the purification step in the production of ethylene glycol by hydrolysis of ethylene oxide, the separation and purification of hydrolyzates of protein, the separation and purification of natural extracts, the separation and purification of amino acids from fermented broth, the separation and purification of synthetic materials, the separation and purification of lecithin from soybeans and egg yolk, the separation and purification of synthetic pharmaceuticals, the separation of isomers of petrochemical products and the like.

[III] Separation Process (1) Fractionation Zone

In order to separate and purify the multicomponent mixture containing at least 3 components and purify each component by using the apparatus 1 for the separation and purification of the multicomponent of the present invention, the multicomponent mixture 11 containing at least 3 components is fed to the top of the column 2a of the uppermost stream of the subgroup positioned in the fractionation zone 3. Also, each flow discharged from each column 2 of the subgroup positioned in the purification zone 4 is refluxed to each column of the subgroup in the fractionation zone 3. Moreover, the exit of column 2a and column 2b, respectively, are connected to the inlet of column 2b and column 2c.

Accordingly, the respective components in the multicomponent mixture described above are passed through the column 2 of the subgroup positioned in the fractionation zone 3. In doing, components having a less distribution coefficient go further. Thus, Component A having a largest distribution coefficient is retained so that it is not flowed out from the column 2a. Component B having a second larger distribution coefficient and Component C having a third larger distribution coefficient are retained so that they are not flowed out from columns 2b and 2c, respectively.

As shown in FIG. 3, the fractionation zone 3 may be divided into multiple stages such as the second fractionation recovery subzone 3c, the first fractionation recovery subzone 3b and the fractionation reflux subzone 3a. Then some of Component C may leave column 2c in the fractionation reflux subzone 3a, because it is captured in fractionation recovery subzones 3b or 3c.

(2) Purification Zone

In each column 2 of the subgroup positioned in the purification zone 4, each of purification mediums 9 is fed to the top of each column 2 to purify each component in the column 2 of the subgroup positioned in the purification zone 4 to remove impure components with lower distribution coefficient.

The effluent with impure components from each column 2 positioned in the purification zone 4 are returned as a reflux to each flow introduced into each column 2 of the subgroup positioned in the fractionation zone 3 described above, respectively, and the fractionation is again carried out in each column 2 of the subgroup positioned in the fractionation zone 3.

As shown in FIG. 3, the purification zone 4 may be divided into the first purification subzone 4a and the second purification subzone 4b and the purification may be carried out in a multistage manner.

(3) Desorption Zone

In each column 2 or the subgroup positioned in the desorption zone 5, each component purified in each column positioned in the purification zone 4 described above (the number of components fractionated and purified is equal to the number of columns 2 of the subgroup) is discharged from each column 2 by each flow of desorption mediums 9 respectively introduced from the top of each column 2. While the desorption mediums 9 are fed in the same direction as a direction of a flow in other zones in FIGS., they can be flowed in a reverse direction. The desorption zone 5 may be divided into a first desorption zone 5a and a second desorption subzone 5b as with the fractionation and purification zones described above and the desorption may be carried out in a multistage manner. In this case, a separated and purified product having high and low concentrations can be obtained in the first and second desorption subzone, respectively. Further, the desorption zone 5 can be disposed between the first purification subzone 4a and the second purification subzone 4b as described earlier.

(4) Movement of Column Groups

When each component which is desired to fractionate in the respective column begins to be detected by a detector 20 provided in the outlet portion of column 2 of the subgroup positioned in the fractionation zone 3 described above. The column group movement is carried out in a direction opposite to a direction of fluid flows in each subgroup by successively moving subgroup columns in each subzone to the next subzone. Alternatively, the flows of fluids in tubings between columns are successively switched by valves 15 to simulate the column-group movement. Alternatively, these methods are combined.

EXPERIMENTAL EXAMPLE

The following nonlimiting example illustrates the apparatus for the separation and purification of the multicomponent mixture of the present invention.

EXAMPLE 1

Separation/Purification Apparatus

Figure 4:
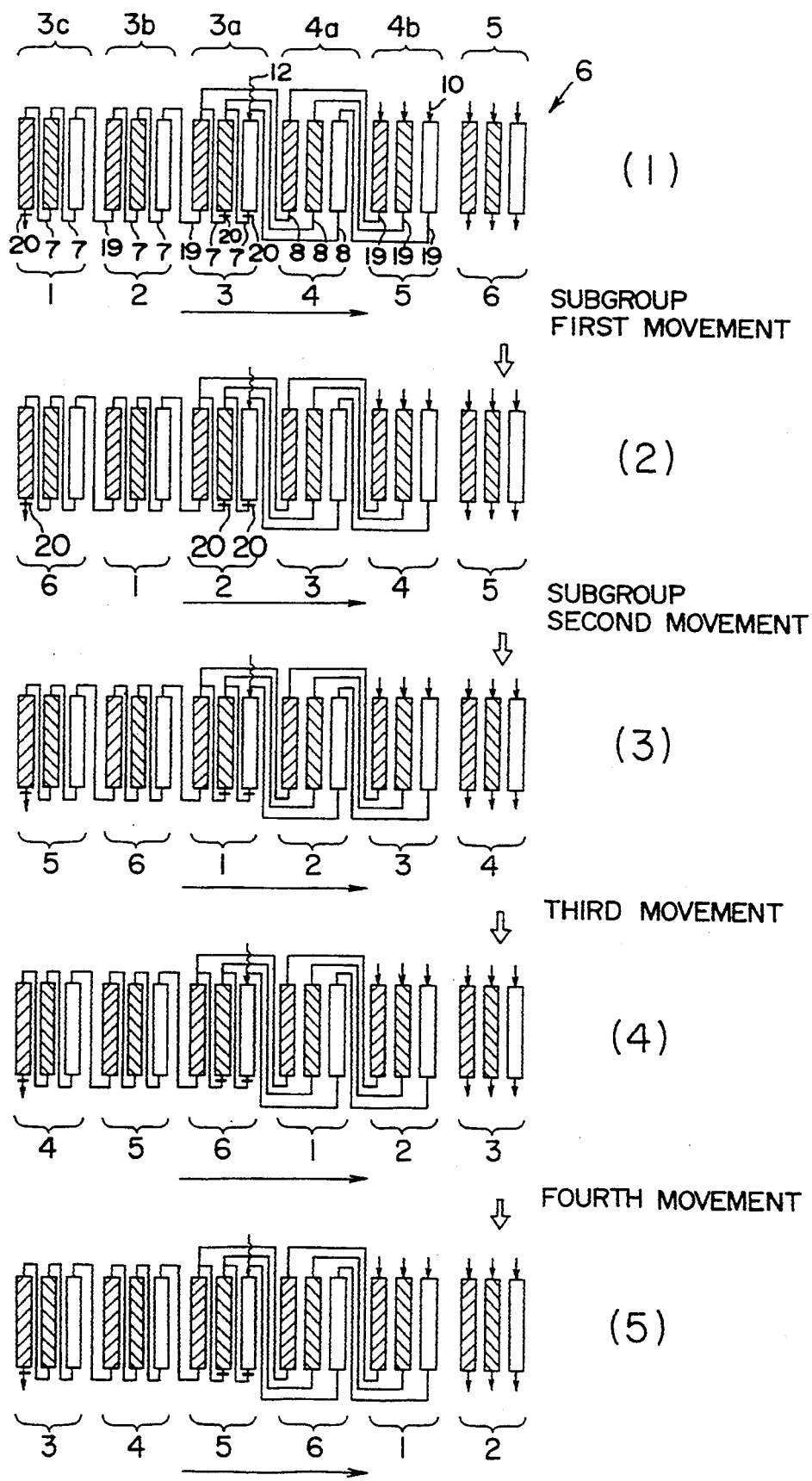
FIGS. 4(1), (2), (3), (4) and (5) is a flow sheet of an apparatus for the separation and purification of a multicomponent mixture showing a state when the column group of the apparatus for the separation and purification of the multicomponent mixture of the present invention shown in FIG. 3 is moved by means of a column movement means in each column subgroup unit.

Columns 2 having an inlet and outlet for fluids provided at the top and bottom of a vessel having an inside diameter of 7.8 mm and length of 250 mm were combined by threes to form one subgroup, and the subgroups were disposed as shown in FIG. 4(1).

That is, the columns 2 were combined by threes to form one basic subgroup and 6 subgroups were used. The first subgroup was disposed in the second fractionation recovery subzone 3c; the second subgroup was disposed in the first fractionation recovery subzone 3b; the third subgroup was disposed in the fractionation reflux subzone 3a; the fourth subgroup was disposed in the first purification subzone 4a; the fifth subgroup was disposed in the second purification subzone 4b; and the sixth subgroup was disposed in the desorption zone 5.

As shown in FIG. 4, the connection of respective columns 2 in the column group 6 was carried out as follows. In the subgroups positioned in the fractionation zone 3, respective columns 2 were all connected in series using the column tubings 7 and subgroup tubings 19. In subgroups positioned in the purification zone 4, columns in the subgroup of the second purification subzone 4b were in parallel connected with columns of the first purification subzone 4a using subgroup tubings 19 so that columns 2a, 2b and 2c of the second purification subzone 4a were connected with columns 2a, 2b and 2c of the first purification subzone 4b, respectively. Further, in order to connect each column of the subgroup positioned in the purification zone and each column of the subgroup positioned in the fractionation zone, each column 2 of the subgroup positioned in the fractionation reflux subzone 3a and each column 2 of the subgroup positioned in the first purification subzone 4a were in parallel connected using zone connection tubings 8 so that columns 2a, 2b and 2c of the first purification subzone 3a were connected with columns 2a, 2b and 2c of the fractionation reflux subzone 4a, respectively.

The column group 6 of separation/purification apparatus 1 was provided with a column movement means 13 for successively moving each column subgroup in the column group 6 from the present subzone to the next subzone described above.

Raw Material Feeding

Purification/desorption mediums 9 fed to each column 2 of the subgroups positioned in the purification zone 4 and desorption zone 5 described above were introduced by means of purification/desorption medium-feeding tubings 10. Further, a multicomponent mixture 11 containing at least 3 components which was a raw material of the apparatus 1 for the separation and purification of the multicomponent mixture of the present invention was continuously fed at a constant rate through a subject mixture-feeding tubing 12.

Concretely, an aqueous solution containing four components: ethylene glycol (Component A), polyethylene glycol having a molecular weight of 1,000 (Component B), polyethylene glycol having a molecular weight of 7,500 (Component C), and polyethylene oxide having a molecular weight of 280,000 (Component D) each in an amount of 1 mg/milliliter was continuously fed to the top inlet of the first column 2a of third subgroup positioned in the fractionation reflux subzone 3a in the column group 6 at a rate of 0.002 milliliters/second and it was combined with a flow discharged from the first column 2a of the fourth subgroup positioned in the first purification subzone 4a.

Feeding of Separation Fluid

At the same timer purification mediums (distilled water) were introduced into the first through third columns 2a, 2b and 2c of the fifth subgroup positioned in the second purification subzone 4b at a rate of 0.008 milliliters/second (first column), 0.009 milliliters/second (second column) and 0.008 milliliters/second (third column), respectively. Also desorption mediums (distilled water) were introduced into the first through third columns 2a, 2b and 2c of the sixth subgroup positioned in the desorption zone 5 at a rate of 0.01 milliliter/second, respectively.

When the subject mixture was passed through the first column 2a of the third subgroup, Component A having a largest distribution coefficient was retained in this column. While Components B, C, and D having smaller distribution coefficients were partially retained in the column 2a, the remainder entered the column 2b.

First Movement

When Component A was detected at the outlet of the column 2a, the first movement of the column group was carried out.

Components A, B, C, and D retained in the column 2a which were now in the first purification subzone were discharged from the column 2a by the purification medium in the order of the smallness of distribution coefficients. Accordingly, much of Component A remained in the column 2a as compared with other components and hence Component A was purified.

The effluent from this column 2a and a newly fed subject mixture were introduced into a column 2a newly disposed in the position of the fractionation reflux subzone and Component A was all retained in this column 2a whereas a portion of Components B, C, and D was transferred to a forward column 2b. Among Components B, C, and D introduced into the column 2b of this fractionation reflux subzone, Component B was retained in this column 2b and a portion of Components C and D having smaller distribution coefficients was transferred to a next column 2c.

Second Movement

When Component A was detected at the outlet of the column 2a in the fractionation reflux subzone or when Component B was detected at the outlet of the column 2b, the second movement of the column group was carried out.

The column 2a having the subject mixture initially loaded were now in the second purification subzone and the purification further proceeded to keep only Component A therein. Similarly, the purification of Component B in the column 2b of the first and second purification subzones proceeded and Components C and D having smaller distribution coefficients were returned to the column 2b of the fractionation reflux subzone and a portion thereof was transferred to a column 2c of the fractionation reflux subzone.

Third Movement

The effluent from the column 2c of the fractionation reflux subzone entered the column 2a of the first fractionation recovery subzone and the effluent from the column 2c of the first fractionation recovery subzone entered the column 2a of the second fractionation recovery subzone.

Accordingly, the third movement of the column group was carried out at the earlier time of the following two cases; when Component A was detected at the outlet of the column 2a of the fractionation reflux subzone or when Component B was detected at the outlet of the column 2b of the fractionation reflux subzone.

The detection of Component C was not carried out at the outlet of column 2c of the fractionation reflux subzone, but it was carried out at the outlet of the column 2c of the second fractionation recovery subzone. This is because Component C recovered in the fractionation recovery subzone was transferred to the fractionation reflux subzone-by the subsequent movement of the column subgroups. Accordingly, liquids containing Component D having a smallest distribution coefficient were flowed out from the outlet of the column 2c of the second fractionation recovery subzone.

On the other hand, the column 2a initially present in the position of the fractionation reflux subzone was transferred to the desorption subzone and Component A was discharged by a desorption liquid from the column. Thus, the desorbed column was transferred to the second fractionation recovery subzone at the next movement and thereafter the same operation was repeated successively.

Steady State

The separation and purification were carried out until the composition of each column exhibited substantially no change with time even by successively moving the columns.

The results are shown in Table 1. $C_o$ represents the concentration of each component in the subject mixture.

The change of the composition of each component with time became negligibly small when about 20 movement operations were carried out.

TABLE 1

| | Ethylene Glycol | Polyethylene Glycol MW | | Polyethylene Oxide MW |
|---|---|---|---|---|
| | | 1,000 | 7,500 | 280,000 |
| Purity (%) | 99.2 | 99.7 | 95.5 | 99.7 |
| Recovery (%) | 100.0 | 99.7 | 94.5 | 99.7 |
| Concentration (C/$C_o$) | 0.199 | 0.189 | 0.200 | 0.083 |

What is claimed is:

1. In a process for separation of a multicomponent mixture into its components comprising subjecting a mixture containing at least three components to adsorption thereof onto adsorbent packed in a plurality of columns wherein the difference in the distribution coefficients of the components is utilized to separate the multicomponent mixture into its components, the improvement which comprises the steps of:

introducing the multicomponent mixture to a purification means to flow therein which comprises a plurality of the columns and is divided into at least three subgroups for respectively defining a fractionation zone which is for fractionation of the mixture into each of the components adsorbed in each of the columns due to the difference in the distribution coefficients of the components, wherein each component adsorbed is still contaminated with other components, a purification zone which is for purifying each of the contaminated components respectively adsorbed in each of the columns by introducing into each of the columns a medium for purification which can wash the contaminant components out of the component adsorbed in each column while some fraction of the component to be purified may remain adsorbed in each respective column, and, a desorption zone which is for desorbing the component adsorbed in each column by introducing a desorbent to each column thereby to obtain each component purified out of each respective column; each zone comprising a set of at least two columns and a given set of columns in a given zone being assigned in turn to fractionation, then to purification, then to desorption and then again to fractionation wherein the set of columns assigned to the fractionation is such that the columns are connected from each other in series where the most upstream column receives the multicomponent mixture, the set of columns assigned to the purification is such that the columns are connected with those assigned for the fractionation so that an effluent from each column of the purification zone is sent to each corresponding column in the fractionation zone; the set of columns used in the fractionation being assigned, upon substantial fractionation having taken place, to the purification and then, upon substantial purification having taken place, to the desorption while the sets of columns used in the purification and in the desorption being sent, upon substantial purification and substantial desorption respectively having taken place, to the desorption and the fractionation, respectively, and then, upon substantial desorption and substantial fractionation respectively having taken place, to the fractionation and purification, respectively; the change in turn of assignment being conducted by moving each set of columns for the fractionation, for the purification and for the desorption from a given zone to another zone so that each set of columns may receive the assignment in the zone to which it has been moved and/or by switching flow of fluids between columns so that the columns may receive the assignment as indicated;

subjecting the multicomponent mixture received by the most upstream column in the fractionation zone to fractionation wherein the components in the multicomponent mixture are adsorbed in the order of the degree of the distribution coefficient in that the component having the highest distribution coefficient is adsorbed in the most upstream column in the zone while each effluent from each column of the set of columns for the purification is introduced to each corresponding column in the fractionation zone;

assigning the set of columns used in the fractionation wherein each column has each component adsorbed therein in accordance with the distribution coefficient of the component in question to the purification wherein a medium for purification is introduced to each column so as to wash the contaminated component out of the component adsorbed therein while the effluent from each column in the purification is sent to each corresponding column of the set of columns which has become assigned to the fractionation; and assigning the set of columns used in the purification wherein each column has each component adsorbed therein and thus purified to the desorption wherein a desorbent is introduced to each column so as to desorb the component adsorbed in each column thereby to obtain each component from each column of the set of columns used in the desorption.

2. The process according to claim 1 wherein at least one of the fractionation zone, the purification zone and the desorption zone is followed downstream therefrom by at least one additional set of columns which is a duplicate of the particular set of column upstream thereto and is connected with the respective set of columns so that:

the additional set of columns in the fractionation zone is connected with the upstream set of columns in the fractionation zone in series in that the columns are connected in series with each other whereby the flow runs through the pair of the sets of columns, the additional sets of columns in the purification zone and in the desorption zone are respectively connected with the respective upstream set of columns in parallel in that each column in the additional set is connected with each corresponding column of said upstream set of columns, and when the additional set of columns comprises a further set of columns in addition to the one referred to above, the further set of columns is connected with the set of columns of the additional set of columns in the same manner as the additional set of columns is connected with the respective upstream set of columns.

3. The process according to claims 1 or 2 wherein the multicomponent mixture is continuously or intermittently fed to the top of the most upstream column of the fractionation zone.

4. The process according to claim 3 wherein the movement of the column group and/or switching of the fluids between columns is carried out at the time before an unacceptable amount of the component to be fractionated in the column is detected in the outlet portion of each column of the subgroup positioned in the fractionation zone.

5. The process according to claims 1 or 2 wherein the movement of the column group and/or switching of fluids between columns is carried out at the time before an unacceptable amount of the component to be fractionated in the column is detected in the outlet portion of each column of the subgroup positioned in the fractionation zone.

* * * * *